E. G. BURKHART.
HOG RINGER.
APPLICATION FILED APR. 28, 1908.
908,947.  Patented Jan. 5, 1909.
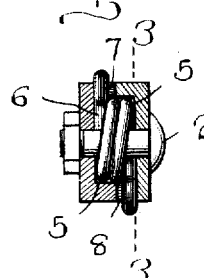
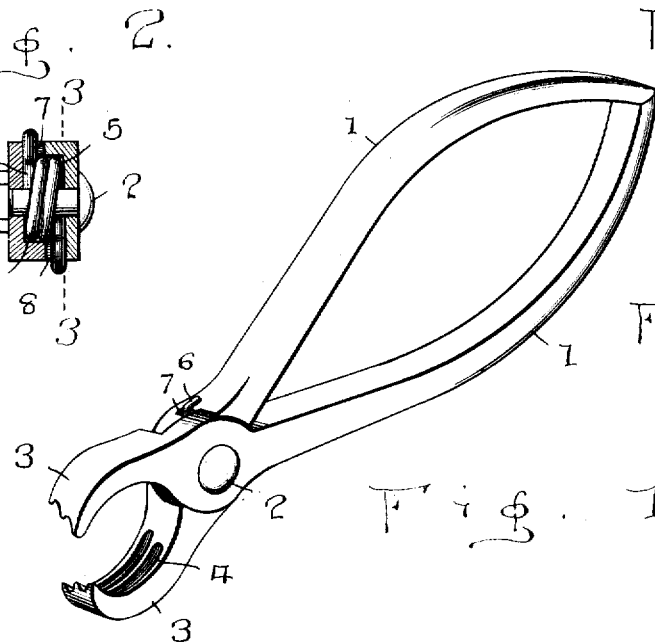
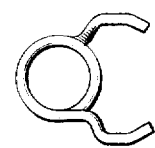
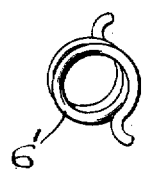
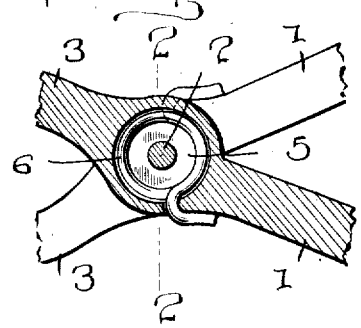
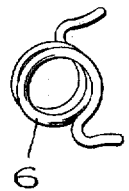
Inventor
E. G. Burkhart.
Witnesses
Thos. W. Riley
W. C. Lawson
By W. J. Fitzgerald
Attorneys

UNITED STATES PATENT OFFICE.

EDWARD GEORGE BURKHART, OF SUMNER, IOWA.

HOG-RINGER.

No. 908,947.

Specification of Letters Patent.

Patented Jan. 5, 1909.

Application filed April 28, 1908. Serial No. 429,641.

*To all whom it may concern:*

Be it known that I, EDWARD GEORGE BURKHART, a citizen of the United States, residing at Sumner, in the county of Bremer and State of Iowa, have invented certain new and useful Improvements in Hog-Ringers; and I do hereby declare the following to be a full, clear, and exact description of the invention, such as will enable others skilled in the art to which it appertains to make and use the same.

This invention relates to new and useful improvements in hog ringers and has primarily for its object to provide a novel device of this character, which will effectually hold the rings to be applied.

It is also an object of the invention to provide a novel device of this character consisting of two members pivoted one to the other, said members having a spring arranged at their pivotal portions to hold the jaws carried by the members normally at the limit of their inward movement.

It is also an object of the invention to provide a novel device of this character, which will readily permit the use of rings of various sizes.

It is also an object of the invention to provide a novel device of this character, which will be simple in construction, efficient and advantageous in practice and comparatively inexpensive to manufacture.

With the above and other objects in view, the invention consists in the details of construction and in the novel arrangement and construction of parts to be hereinafter referred to.

In describing the invention in detail, reference will be had to the accompanying drawings forming part of this specification, wherein like characters of reference denote corresponding parts in the several views and in which—

Figure 1 is a view in perspective of the invention. Fig. 2 is a sectional view as indicated on line 2—2, Fig. 3. Fig. 3 is a view taken on line 3—3, Fig. 2. Fig. 4 is a view in perspective of the coil spring used in the invention, and, Fig. 5 is a view of a slightly modified form of spring. Figs. 6 and 7 illustrate further modified forms of springs.

In the drawings, 1 denotes two members pivoted intermediate their length by the bolt 2. Adjacent end portions of the members 1 are formed into segmental jaws 3 having their inner faces grooved longitudinally as at 4, said grooves being of various lengths to accommodate rings of different sizes. These grooves communicate with the free ends of the jaws 3 and in order that said free ends may not interfere with the application of the various rings, the free edges are arranged on converging planes one with relation to the other, as is fully shown in Fig. 1.

The opposed faces of the overlapping portions of the members 1 are dished as at 5. Within the dished portions of the members is located a coiled spring 6, which has one free end portion passing through an opening 7 in one of the members 1 and an opposite free end portion passing through an opening 8 in the second member 1. By this arrangement, the spring will cause the jaws 3 to approach each other and will firmly bind a ring inserted between the jaws.

The end portions of the members 1 opposite to the jaws 3 are bowed and are so constructed that their free ends contact with each other and thereby limit the movement of the jaws 3 in their relation to each other. The contact of the free ends of the bowed portions of the members 1 is such as to hold the jaws 3 separated under all conditions in order to facilitate the insertion of a ring therebetween.

It is to be stated that the form of ringer illustrated in the accompanying drawing need not, of necessity, be employed, as any of the well-known ringers now in use may be supplied with the essential features of the present invention, which are mainly the dished overlapping portions and the coil springs therein.

With reference to the spring, it is to be stated that any form of spring is to be employed that will operate with proper facility. In Fig. 5 of the drawings, 6' indicates a slightly modified form of spring, but these springs can be further changed, as is believed to be apparent.

It has been hereinbefore stated that the ringer is intended to be employed with rings of various sizes. By this is meant that the ring can be employed with the hog size or the pig size.

As the forms of springs shown in Figs. 6 and 7 have in practice proven most desirable, it is thought well that the same should be illustrated. It is not believed, however, that a brief description thereof need be given.

What I claim is:

In a device of the character described, the combination of two members crossing each other intermediate their lengths, the opposed faces of the members being dished, a pivot pin passing through the members and through the dished portions thereof, said members having openings in the walls of the dished portions, the opening in one member being opposed to the opening of the second member, said openings being in different planes, a spiral spring embracing the pivot pin of the members, the ends of said springs being angular, and passing through the openings of the dished portions, the extended portion of the springs bearing against the exterior surfaces of the dished portion, adjacent ends of the members being formed into jaws, the opposite end portions being bowed, the said jaws being segmental, and having a plurality of grooves in their opposed faces of varying lengths, the free end edges of the jaws being arranged on an incline whereby a larger opening will be formed on one side of the jaws than on the other, the longer grooves in the jaws being adjacent the side of the jaw having the largest opening.

In testimony whereof I have signed my name to this specification in the presence of two subscribing witnesses.

EDWARD GEORGE BURKHART.

Witnesses:
SAMUEL MATHESON,
E. L. BOPP.